United States Patent [19]

Turrie

[11] Patent Number: 4,852,053

[45] Date of Patent: Jul. 25, 1989

[54] MATERIAL AND ENERGY BALANCE RECONCILIATION

[75] Inventor: Bruce D. Turrie, Crosby, Tex.

[73] Assignee: Exxon Chemical Patents Inc., Linden, N.J.

[21] Appl. No.: 149,967

[22] Filed: Feb. 3, 1988

Related U.S. Application Data

[63] Continuation of Ser. No. 788,814, Oct. 18, 1985, abandoned.

[51] Int. Cl.[4] ............................................. G05B 13/00
[52] U.S. Cl. ................................... 364/151; 364/157; 137/391; 137/400
[58] Field of Search ............................... 364/148–152, 364/157; 137/386, 389, 391, 400

[56] References Cited

U.S. PATENT DOCUMENTS

| 3,394,053 | 7/1968 | Shinskey | 364/149 |
|---|---|---|---|
| 3,601,588 | 8/1971 | Bristol | 364/151 |
| 4,111,218 | 9/1978 | Hobbs | 364/148 |
| 4,197,576 | 4/1980 | Sanchez | 364/151 |
| 4,249,908 | 2/1981 | Funk | 364/152 |
| 4,257,105 | 3/1981 | Stewart et al. | 364/149 |
| 4,385,362 | 5/1983 | Arcara | 364/151 |
| 4,551,796 | 11/1985 | Singh | 364/148 |
| 4,562,552 | 12/1985 | Miyaoka et al. | 364/148 |
| 4,570,230 | 2/1986 | Wilson et al. | 364/477 |
| 4,578,747 | 3/1986 | Hideg et al. | 364/151 |

OTHER PUBLICATIONS

"Internal Model Control", C. E. Garcia and M. Morari, Ind. Eng. Chem. Process Des. DEv., 1982, vol. 21, pp. 308–323.
"Dual Composition Control in a $C_3/C_4$ Splitter", R. V. Bartman, CEP, Sep. 1981, pp. 58–62.

Primary Examiner—John R. Lastova

[57] ABSTRACT

A method for controlling a system parameter based on controlling a setpoint for a process control variable includes measuring the rate of input to and output from a vessel. The difference between the input and output rates is determined to provide an expected rate of accumulation in the vessel. The actual rate of accumulation in the vessel is measured. The difference between the expected rate of accumulation and the actual rate of accumulation is determined to provide a bias term. A value for the setpoint for the process control variable is calculated by solving one of a material or energy balance equation which includes the bias term and a term representative of a predetermined time period during which the controlled parameter is to reach a desired value. The setpoint for the process control variable is then controlled based on the calculated setpoint value. An apparatus is disclosed for carrying out the disclosed method.

19 Claims, 3 Drawing Sheets

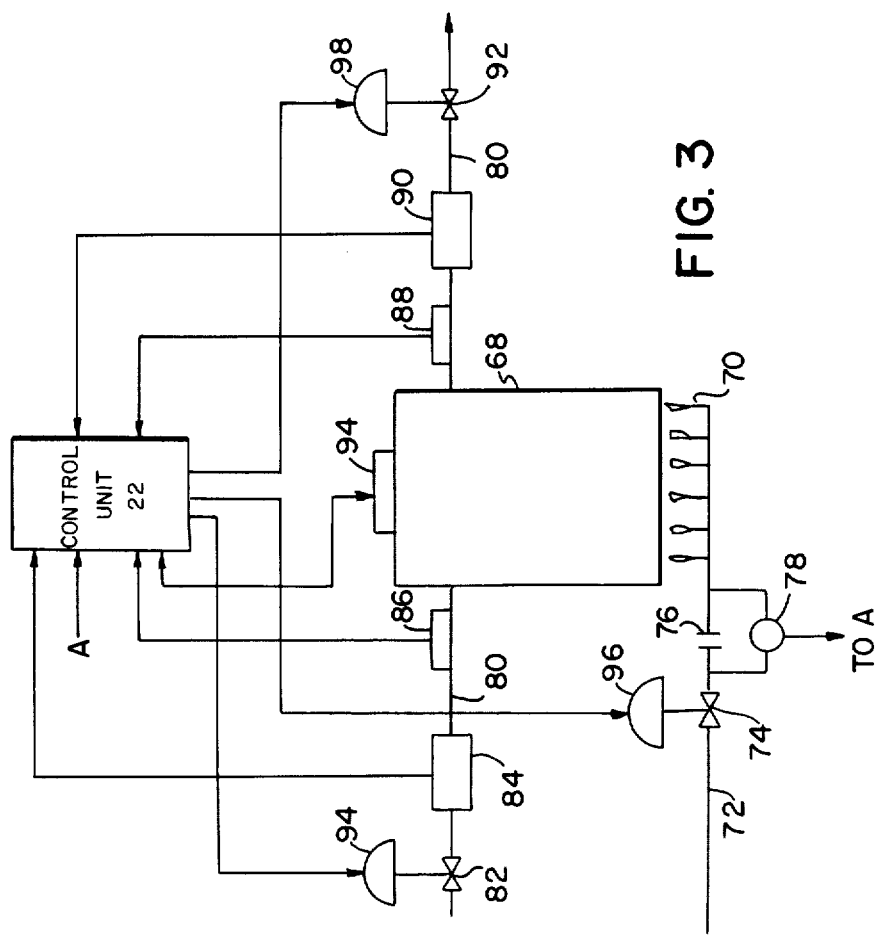

4,852,053

MATERIAL AND ENERGY BALANCE RECONCILIATION

This is a continuation of application Ser. No. 788,814 filed Oct. 18, 1985, now abandoned.

BACKGROUND OF THE INVENTION

The present invention is directed generally to a method and apparatus for controlling a setpoint for a process control variable, and more particularly, to a method and apparatus utilizing a dynamic reconciliation technique.

Numerous types of controllers and control systems are known which take advantage of process models for controlling a process parameter. In one type a simple dynamic relationship is assumed between the manipulated process variable and the controlled process parameter. The known value of the manipulated variable is then used with the model to estimate the controlled process parameter. The difference or bias between the predicted value of the controlled parameter and the measured value of that parameter is used to adjust the manipulated process variable to move the controlled process parameter to the desired value. This technique is called "Internal Model Control" and was described by C. E. Garcia and M. Morari in IEC. Proc. Des. and Dev., Volume 21 in 1982.

Another technique postulates a simple dynamic relationship between a process parameter which can be easily measured, such as a temperature, and the process parameter to be controlled, such as a concentration, which is more difficult to measure. The model and the easily measured process parameter are then used to estimate the controlled process parameter. Once again the value of the controlled process parameter predicted by the model is compared with the measured value of the controlled process parameter and a difference or bias is calculated. This bias is then used to adjust the manipulated process variable to move the controlled process parameter to its desired value. This technique is called Dynamic Reconciliation and was described in an article by Robert V. Bartman entitled "Dual Composition Control in a $C_3/C_4$ Splitter" appearing in the September 1981 issue of CEP.

An alternative approach is to use a material or energy balance model to estimate the controlled process parameter. As in the above techniques the difference between the model estimate of the controlled process parameter and the measured value of the controlled process parameter is used to adjust the manipulated variable to move the controlled process parameter to its desired value. This is the approach described herein.

SUMMARY OF THE PRESENT INVENTION

The present invention is directed to a method for controlling a system parameter based on controlling a setpoint for a process control variable. The method includes the steps of measuring the rate of input to and output from a vessel. The difference is then determined between the input and output rates to provide an expected rate of accumulation in the vessel. The actual rate of accumulation in the vessel is measured. The difference between the expected rate of accumulation and the actual rate of accumulation is determined to provide a bias term. A value for the setpoint for the process control variable is calculated by solving one of a material or energy balance equation which includes the bias term and a term representative of a predetermined time period during which the controlled parameter is to reach a desired value. The setpoint for the process control variable is then controlled based on the calculated setpoint value.

In one embodiment of the present invention it is anticipated that the step of measuring the rate of input to and output from a vessel includes the step of measuring the rate of flow of material input to and output from the vessel. In such an environment, the difference between the input and output flow rates is determined to provide an expected rate of accumulation of material in the vessel. The actual rate of accumulation in the vessel is measured. The difference between the expected rate of accumulation and the actual rate of accumulation is determined to provide a bias term. A material balance equation of the general type wherein the actual rate of accumulation of material in the vessel equals the expected rate of accumulation of material in the vessel plus the bias term is solved to provide a value for the setpoint for the process control variable.

In another embodiment of the present invention the step of measuring the rate of input to and output from a vessel includes the step of measuring the rate of energy added to and energy removed from the vessel. In such an environment, the difference between the energy input and energy output rate is determined to provide an expected rate of accumulation of energy in the vessel. The actual rate of accumulation of energy in the vessel is measured. The difference between the expected rate of accumulation and the actual rate of accumulation is determined to provide a bias term. An energy balance equation of the general type wherein the actual rate of accumulation equals the expected rate of accumulation plus the bias term is solved to provide a setpoint for the process control variable. The process control setpoint is then controlled based on the calculated setpoint value.

The present invention is also directed to an apparatus for controlling a system parameter based on controlling a setpoint for a process control variable. The apparatus is comprised of means for measuring the rate of input to and output from the vessel, means for determining the difference between the input and output rates to provide an expected rate of accumulation in the vessel, sensing means for sensing the actual rate of accumulation in the vessel and means for determining the difference between the expected rate of accumulation and the actual rate of accumulation to provide a bias term. Means for calculating are provided for calculating a value for the setpoint for the process control variable by solving one of a material or energy balance equation which includes the bias term and a term representative of a predetermined time period during which the controlled parameter is to reach a desired value. Output means control the setpoint for the process control variable based on the calculated setpoint value.

The present invention compensates for sensor errors by including a bias term in the equation which is representative of errors in the system. In an ideal system, the bias term would have a value of zero. However, under real world conditions, the addition of this bias term to the equation provides a very accurate indication of the control action necessary to achieve the desired result. Additionally, by including a term in the equation representative of a predetermined time period during which the controlled parameter is to reach a desired value, the system can be driven as quickly or as slowly as desired.

These represent substantial advantages over the prior art. These and other advantages and benefits of the present invention will become apparent from the description of a preferred embodiment hereinbelow.

DESCRIPTION OF THE DRAWINGS

In order that the present invention may be clearly understood and readily practiced, preferred embodiments will now be described, by way of example only, with reference to the accompanying figures wherein:

FIG. 3 illustrates a reactor vessel together with various sensors and control equipment controlled by a control system constructed according to the teachings of the present invention.

DESCRIPTION OF A PREFERRED EMBODIMENT

The present invention will now be described in conjunction with a particular emobodiment. However, it should be recognized that the particular environment in which the present invention is described, is intended for purposes of illustration only, and not limitation. There are numerous environments in which the Dynamic Reconciliation Process Control Method and Apparatus of the present invention can be used.

Figure 1:
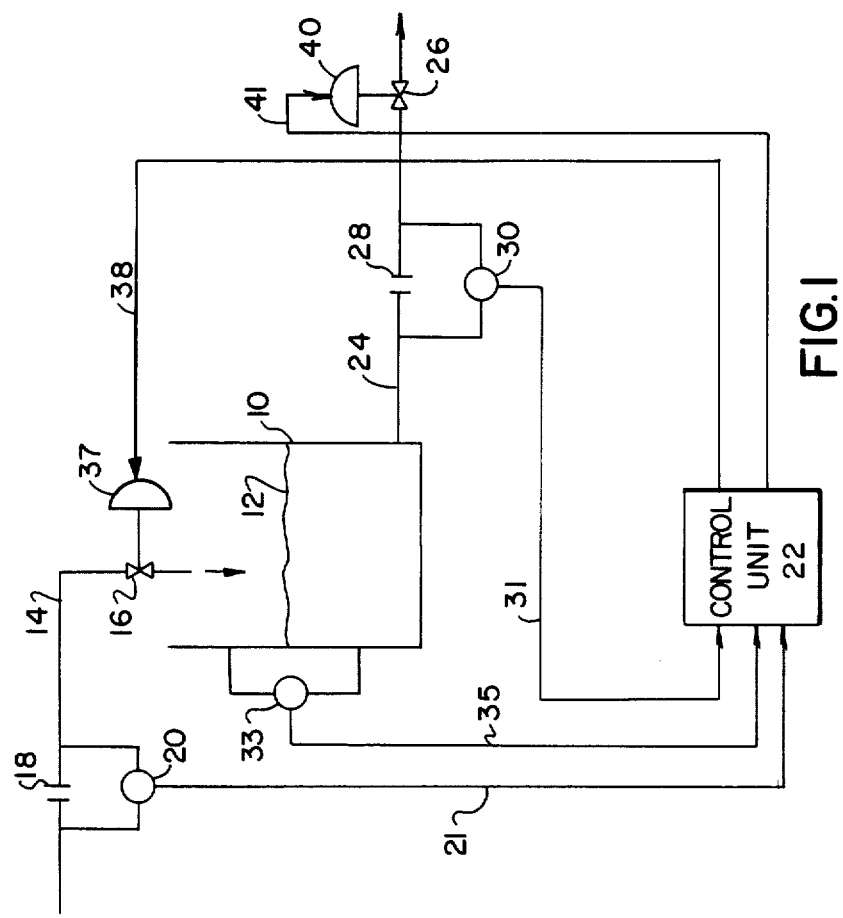
FIG. 1 illustrates a vessel together with various sensors and control equipment controlled by a control system constructed according to the teachings of the present invention.

In FIG. 1, a vessel 10 contains a material 12 undergoing a process. The material 12 is input to the vessel 10 through an input pipeline 14 having an input valve 16. The position of the input valve 16 determines the flow rate of material 12 into the vessel 10. The flow rate of material 12 through pipeline 14 is measured by an orifice plate 18 and a differential pressure gauge 20. The differential pressure gauge 20 produces an output signal representative of the flow rate of material 12 into the vessel 10 which is input to a control unit 22 through line 21.

Material 12 can be removed from vessel 10 through an output pipeline 24 having an output valve 26. The position of the output valve 26 determines the flow rate of material 12 through output pipeline 24. The flow rate of material 12 through output pipeline 24 is measured by an orifice plate 28 and a differential pressure gauge 30. Pressure gauge 30 produces an output signal representative of the flow rate of material 12 through output pipeline 24 which is input to a control unit 22 through a line 31.

The level of material 12 in the vessel 10 is measured by a differential pressure gauge 33. A signal representative of the level of material 12 in the vessel 10 is input to the control unit 22 from the pressure gauge 33 through a line 35.

Those of ordinary skill in the art should recognize that other devices for providing flow or level indications may be used. The illustration of orifice plates and differential pressure gauges is for purposes of illustration only, and not intended as a limitation.

The control unit 22 performs a sequence of operations, described more fully hereinbelow in conjunction with FIG. 2, to produce output signals for controlling the process carried out in the vessel 10. An output signal may be input to a controller 37 through a line 38 for controlling the position of the input valve 16 or an output signal may be input to a controller 40 through a line 41 for controlling the position of the output valve 26, or both. In this manner, control unit 22 can precisely control the flow of material 12 into and out of the vessel 10 as well as the level of material 12 in the vessel 10.

The control unit 22 working with the raw data received from pressure gauges 20, 30, and 33 solves, in the embodiment shown in FIG. 1, a material balance equation. The equation solved by the control unit 22 is derived from the following basic material balance equation:

$$dM/dt = F_{in} - F_{out} + F_{gen} \quad (1)$$

Where dM/dt is the actual measured rate of accumulation of material 12 in the vessel, $F_{in}$ and $F_{out}$ are the measured flow rates of material 12 into and out of the vessel 10, and $F_{gen}$ represents any generation of material 12 within the vessel 10. Equation (1) can be expressed as a difference equation:

$$\frac{M(t) - M(to)}{t - to} = F_{in}(t) - F_{out}(t) + F_{gen}(t) \quad (2)$$

Equation (2) can be made into a basic material balance reconciliatin equation by adding a bias term B(t) to compensate for sensor as well as other errors in the system.

$$\frac{M(t) - M(to)}{t - to} = F_{in}(t) - F_{out}(t) + F_{gen}(t) + B(t) \quad (3)$$

Rearranging equation (3):

$$B(t) = \frac{M(t) - M(to)}{t - to} - (F^*(t)_{in} - F^*(t)_{out} + F^*(t)_{gen}) \ldots \quad (4)$$

where the superscript * is used to indicate that the input and output flowrates have been adjusted (if necessary) to the same dynamic frame as the controlled variable.

At this point, it may be advisable to pass the bias term, B, through a lead/lag algorithm. Experience indicates that a lead is seldom required but that filtering is often advisable. Thus a filtered bias term can be produced using $$B_f(t) = B_f(to) + a(B(t) - B_f(to)) \quad (5)$$

Substituting the filtered bias term into equation (3) and solving for the setpoint of the manipulated variable, in this case $F_{in}{}^{sp}(t)$:

$$F^{sp}_{in}(t) = \frac{M(t)^{sp} - M(t)^{pv}}{Tau} + F(t)_{out} - F(t)_{gen} - B_f(t) \quad (6)$$

where the abbreviations sp and pv stand for setpoint and present value, respectively, and the new parameter. Tau, represents the time allotted for the controlled parameter to reach the setpoint, i.e. desired value. Depending upon the process involved, the generation rate $F_{gen}(t)$ or the output flow rate setpoint $F_{out}{}^{sp}(t)$ may be the manipulated variable.

Those of ordinary skill in the art will recognize that the solution of equation (6) for the setpoint value for the manipulated control variable can be simply and quickly calculated by a suitably programmed microprocessor or microcomputer. It is anticipated that control unit 22 could include a commercially available microprocessor or microcomputer suitably programmed to solve equation (6).

Figure 2:
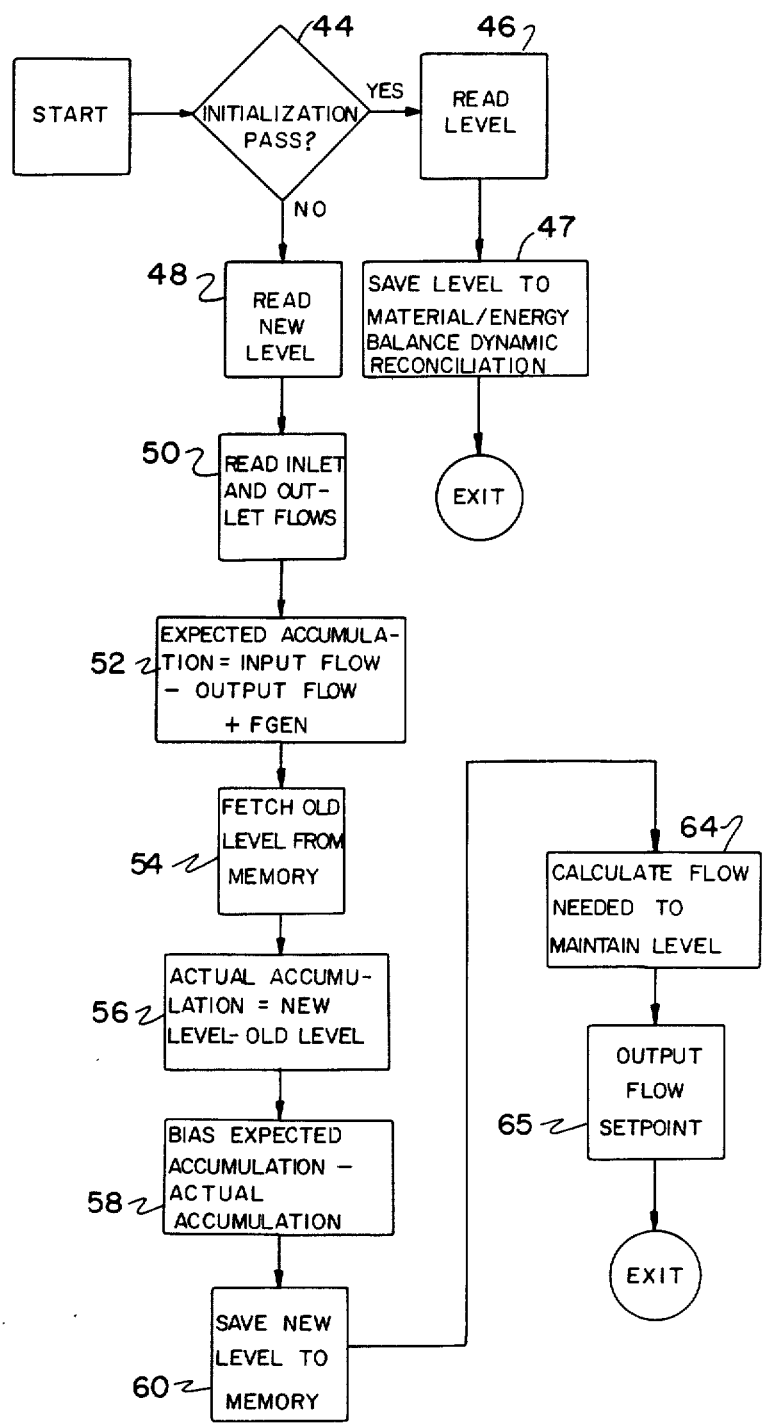
FIG. 2 is a flow chart illustrating the steps carried out by the control unit shown in FIG. 1.

A flow chart illustrating the steps carried out by the control unit 22 is illustrated in FIG. 2. The flow chart illustrated in FIG. 2 begins with decision step 44 wherein the control unit 22 determines if this is the initial pass through the program. If that question is answered affirmatively, the control unit 22 reads the current, or new, level of material 12 in the vessel 10 from pressure gauauge 33 at step 46. This level reading is then stored in memory at step 47 for future use and the control unit 22 exits the program.

If at decision step 44 the control unit 22 determines that this is not the initial pass through the program, the control unit 22 then reads the current level of material 12 in the vessel 10 at step 48. At step 50, the inlet and outlet flow rates are read from pressure gauges 20 and 30, respectively.

The control unit 22 then determines the expected rate of accumulation by determining the difference between the input flow rate, and the output flow rate at step 52 and adding any generation term.

The value of the term $F_{gen}(t)$ is determined. This value may be determined from either a lookup table in which the control unit 22 merely looks up an appropriate value depending upon such parameters as input flow, output flow, temperature, pressure, etc. Alternatively, the value for the term $F_{gen}(t)$ may be calculated in a separate subroutine depending upon the particular process being carried out in vessel 10.

At step 54, the old, or previous, level reading of material 12 in the vessel 10 is brought from memory. At step 56, the actual rate of accumulation of material 12 in the vessel 10 is determined by determining the difference between the current level reading and the old level reading.

At step 58, the bias term B is provided by determining the difference between the expected rate of accumulation of material in the vessel and the actual rate of accumulation of material in the vessel. If required, the bias term B may also be filtered. At step 60, the new or current level reading is input to memory for use in the next pass through the program.

At step 64, the control unit 22 solves equation (6) to determine a new value for the setpoint of the controlled process control variable. In our example, the control unit 22 solves equation (6) for the value of the input flow control setpoint. When the control unit 22 reaches equation 64, it has all the information required for solving equation (6). The term $(M^{sp}(t) - M^{pv}(t))/Tau$ specifies that you want M to move from its present value (pv) to its desired value (sp) in time Tau. The output flow $F_{out}(t)$ was read at step 50, as was the generation term $F_{gen}$. The bias term $B_f(t)$ was determined, and filtered if necessary, at step 58.

Once the calculated setpoint value is obtained, it is output at step 65 to controller 37 which controls the position of the valve 16. Clearly, the flow chart illustrated in FIG. 2 could be modified such that the position of the output valve 26 rather than the input valve 16 is controlled.

The present invention may also be used in conjunction with an energy rather than a material balance equation. The necessary instrumentation for effecting an energy balanced system is illustrated in FIG. 3. In FIG. 3 a vessel 68 is charged with a material or materials which will undergo a chemical reaction within the vessel 68. To effect the chemical reaction, the vessel 68 is to be maintained at a predetermined elevated temperature. In order to add heat to the vessel 68 a plurality of gas jets 70 are provided. Gas is provided to the jets 70 through a pipeline 72 having a valve 74 and an orifice plate 76. The orifice plate 76 acts in combination with differential pressure gauge 78 to provide an indication of the rate of gas flow in the pipeline 72.

In order to remove heat from the vessel 68 a pipeline 80 is provided to supply coolant to the vessel 68. The pipeline 80 includes an input valve 82, a flowmeter 84, a temperature sensor 86 for measuring the temperature of the coolant flowing into the vessel 68, a temperature sensor 88 for measuring the temperature of the coolant leaving the vessel 68, a flowmeter 90, and an output valve 92.

The vessel 68 is provided with a temperature sensor 94 which produces an output signal input to the control unit 22. The signals produced by the pressure gauge 78, flowmeters 84 and 90, and temperature sensors 86 and 88 are also input to the control unit 22. The control unit 22 produces output signals input to a controller 94 for controlling valve 82, a controller 96 for controlling valve 74, and a controller 98 for controlling valve 92.

In operation, the dynamic reconciliation process control method operates substantially as described above except that energy in the form of heat, rather than material flow, is used to control the system. In other words, the actual rate of accumulation of energy, or heat, within the vessel 68 must equal the expected rate of accumulation of energy plus the bias term.

Referring to equation (3), the left-hand side of the equation is the actual measured rate of accumulation of energy (heat) as determined by successive measurements of the temperature sensor 94. The energy input to the system is determined by the amount of gas supplied to the jets 70 plus the temperature and flow rate of the coolant into the vessel 68. The removal of heat from the system is determined by the temperature and flow rate of coolant out of the vessel 68. The term $F_{gen}(t)$ is replaced by a term representative of any heat generated by the chemical reactions occurring within the vessel 68. The expected rate of accumulation of energy is determined by determining the difference betwen the rate of energy input to the vessel 68 and the rate of energy output from the vessel 68. The bias term is obtained by determining the difference between the expected rate of accumulation of energy and the actual rate of accumulation of energy. The setpoint of the variable which is to be controlled can be determined in a manner similar to that described above in conjunction with FIG. 2.

EXAMPLE 1

The reconciliation process control system of the present invention can be implemented in a wide variety of environments. For example, in one application the bed level of a reactor was controlled. In this application, the setpoint of a product discharge rate controller was adjusted to maintain the desired bed level. Unfortunately, neither the polymer production rate (generation) nor the product discharge rate (output) were directly measurable. Instead, the production rate was inferred from a heat balance around the cycle gas cooler. Product discharge was a continuous, batch operation. A PMX drop rate controller was used to initiate the product discharge sequence at a specified frequency. The amount of product removed in a single drop varied with reaction conditions as well as the mechanical condition of the discharge system. The discharge rate was inferred based upon the drop rate (discharges per hour) and fluidized bed density using a simple correlation.

The actual reconciliation was performed on bed weight, not level. Thus the key variables for substitution into equation (3) were:

$C(t) = \text{Bed Wt}(t) = \text{Bed Level} * \text{Fluid Bed Dens} * 0.1653$ $F^*_{gen}(t) = \text{Production Rate (t)}$ $F^*_{out}(t) = 0.1724 * \text{Fluid Bed Dens} * \text{Discharge Rate}$ The reactor level measurement was very noisy. In order to avoid excessive control action the bias was then passed through a filter, equation (5), with the filter factor set to 0.55. In addition the reconciliation calculation, equation (4), was performed only once every five minutes.

The best value for Tau (20 minutes) was determined by trial and error. The control calculation, equation (6), was performed once per minute. This system resulted in very accurate control of the bed level.

EXAMPLE 2

Another example involved an application wherein the partial pressure of an ethylene feed gas was controlled. Once again there were a few complications. First, ethylene was fed to the reactor on pressure demand. Therefore its partial pressure could not be directly controlled. Instead, the buildup of inerts in the reactor was controlled by periodic venting of the reaction mixture. These inerts consisted of nitrogen (used to carry catalyst into the reactor) isopentane (the co-catalyst carrier) and ethane (produced by a side reaction). Nitrogen and isopentane feed rates were both measured but ethane generation was inferred using a correlation based upon hydrogen concentration and production rate. A final problem involved the product discharge system. During a product discharge sequence, reaction gas is lost. Most of this gas is returned by a recycle compressor, but an unmeasured quantity is lost. Once again this flow was inferred.

The key variables for substitution into equation (3) were:

$C(t) = (\text{Nitrogen} + \text{Isopentane} + \text{Ethane}) * \text{Total Moles Gas}$ $F^*_{gen}(t) = \text{Ethane Generation Rate (t)}$ $F^*_{in}(t) = \text{Nitrogen Feed} + \text{Isopentane Feed}$ $F^*_{out}(t) = C(t)*(\text{Vent Rate} = \text{Discharge Losses})/\text{Total Gas Moles}$ The resulting bias was then passed through the filter, equation (5), with the filter factor set to 0.2. This was a very heavy filter, but it was necessary due to analyzer signal to noise ratio. Again, the control method of the present invention worked well.

In addition to the aforementioned examples, the present invention may be used for controlling the following processes: distillation columns (hip and bottom reboiler level control, overhead condensor level control, steam addition to steam heated reboilers, and fuel rate to direct fired reboilers), steam systems (steam header pressure regulation and boiler feedwater level control), furnaces (regulation of fuel to maintain temperature), high pressure tubular or autoclave LDPE reactors (modifier inventory control, ethylene vinyl acetate inventory control, initiator addition rate control and high and low pressure separator polymer inventory control), and low pressure gas phase polyolefin reactors (polymer inventory control, comonomer inventory control, monomer inventory control, inerts inventory control, catalyst inventory control, co-catalyst inventory control, reaction temperature control and chain transfer agent inventory control).

The present invention represents a substantial advance over the prior art. Not only does the present invention take into account various errors occurrng throughout the system, but it also enables the system to be continuously controlled. The accuracy of the present invention will enable higher production rates, improved transitions resulting in less offspec material and improved monomer utilization, and reduced offspec material due to lower steady state variability in resin density. While the present invention has been described in connection with exemplary embodiments thereof, it will be understood that many modifications and variations will be readily apparent to those of ordinary skill in the art. This application and the following claims are intended to cover those modifications and variations.

What is claimed is:

1. A method for controlling a parameter of a system based on controlling a setpoint for a process control variable, comprising the steps of:

measuring the rate of input to and output from a vessel;

measuring the actual rate of accumulation in said vessel;

calculating a model bias factor by solving a first model equation by determining the difference between the input and output rates to provide a calculated expected rate of accumulation in said vessel and determining the difference between said expected rate of accumulation and said actual rate of accumulation to provide said model bias factor;

calculating a value for said setpoint for said process control variable by solving a second model equation, said second model equation being representative of the balance of material or energy in said system and including a term representative of (i) a predetermined time period during which said parameter is to reach a desired value and (ii) said model bias factor, said model bias factor being a function of error in said first model equation and providing for adjustment to said second model equation based upon said error, said error corresponding to the difference between said calculated expected rate of accumulation and the measured actual rate of accumulation; and controlling said setpoint for said process control variable based on said calculated setpoint value.

2. The method of claim 1 wherein said step of measuring the rate of input to and output from a vessel includes the step of measuring the rate of flow of material input to and output from the vessel.

3. The method of claim 2 wherein determining the difference between the input and output rates includes the step of determining the difference between the input and output flow rates to provide an expected rate of accumulation of said material in said vessel.

4. The method of claim 3 wherein said step of measuring the actual rate of accumulation includes the step of measuring the actual rate of accumulation of material in said vessel.

5. The method of claim 4 wherein said step of measuring the actual rate of accumulation of material in said vessel includes the steps of periodically measuring the level of material in said vessel to provide a series of level measurements, and comparing the current level measurement to the previous level measurement to provide an indication of the actual rate of accumulation of material in said vessel.

6. The method of claim 4 wherein said second model equation is formulated such that said actual rate of accumulation equals said expected rate of accumulation plus said model bias factor.

7. The method of claim 6 wherein said calculating step includes the step of calculating a value for an input flow control setpoint.

8. The method of claim 6 wherein said calculating step includes the step of calculating a value for an output flow control setpoint.

9. The method of claim 6 wherein said second model equation further includes a term representative of a substance generated within said vessel.

10. The method of claim 1 comprising the further step of filtering said model bias factor.

11. The method of claim 1 wherein said step of measuring the rate of input to and output from a vessel includes the step of measuring the rate of energy added to and energy removed from said vessel.

12. The method of claim 11 wherein determining the difference between the input and output rates includes the step of determining the difference between the energy input and energy output rates to provide an expected rate of accumulation of energy in said vessel.

13. The method of claim 12 wherein said step of measuring the actual rate of accumulation includes the step of measuring the actual rate of accumulation of energy in said vessel.

14. The method of claim 13 wherein said step of measuring the actual energy in said vessel includes the steps of periodically measuring the energy in said vessel to provide a series of energy measurements, and comparing the current energy measurement to the previous energy measurement to provide an indication of the actual rate of accumulation of energy in said vessel.

15. The method of claim 13 wherein said second model equation is formulated such that said actual rate of accumulation equals said expected rate of accumulation plus said model bias factor.

16. The method of claim 15 wherein said calculating step includes the step of calculating a value for an input fuel control setpoint.

17. The method of claim 15 wherein said calculating step includes the step of calculating a value for an input coolant flow control setpoint.

18. The method of claim 15 wherein said second model equation further includes a term representative of heat generated within said vessel.

19. An apparatus for controlling a parameter of a system based on controlling a setpoint for a process control variable of a process carried out in a vessel, comprising:

means for measuring the rate of input to and output from said vessel;

sensing means for sensing the actual rate of accumulation in said vessel;

means for calculating a model bias factor by solving a first model equation including means for determining the difference between the input and output rates to provide a calculated expected rate of accumulation in said vessel and means for determining the difference between said expected rate of accumulation and said actual rate of accumulation to provide said model bias factor;

means for calculating a value for said setpoint for said process control variable by solving a second model equation, said second model equation being representative of the balance of material or energy in said system and including a term representative of (i) a predetermined time period during which said parameter is to reach a desired value and (ii) said model bias factor, said model bias factor being a function of error in said first model equation and providing for adjustment to said second model equation based upon said error, said error corresponding to the difference between said calculated expected rate of accumulation and the measured actual rate of accumulation; and output means for controlling said setpoint for said process control variable based on said calculated setpoint value.

* * * * *